Aug. 5, 1947.  J. E. SHEPHERD  2,425,009

PHASE-SENSITIVE DETECTOR

Filed June 29, 1943

INVENTOR
JAMES E. SHEPHERD
BY
Paul R. Hunter
ATTORNEY

Patented Aug. 5, 1947

2,425,009

UNITED STATES PATENT OFFICE 2,425,009

PHASE-SENSITIVE DETECTOR

James E. Shepherd, Hempstead, N. Y., assignor to Sperry Gyroscope Company, Inc., a corporation of New York Application June 29, 1943, Serial No. 492,730

4 Claims. (Cl. 172—245)

My invention relates to phase responsive systems and electronic circuits.

An object of the invention is to provide an improved phase detector and to provide phase responsive systems in which no voltage or current mixing is required to take place in rectifier elements.

A further object of my invention is to provide phase responsive systems in which no transformers are required and in which full wave action may be obtained.

Still another object of the present invention is to provide a phase responsive system which is fully electronic and in which amplification may be obtained simultaneously with phase detection.

Other and further objects and advantages will become apparent as the description proceeds.

In carrying out my invention in one preferred form thereof, I provide two units for combining two voltages to be compared in phase with the phase relationship of one of the voltages reversed in one of the combining units. In addition, I provide means for rectifying the outputs of the combining units and combining said outputs in opposed relation so that the net output varies in magnitude and polarity in accordance with the variations in phase relationship between the input voltages.

In carrying out my invention in accordance with another preferred form thereof, I utilize a pair of push-pull connected amplifiers, each having two separate control elements such as control grids and screen grids. Means are provided for supplying one input voltage such as a reference voltage to the one set of grids connected push-pull, with the connections in one push-pull amplifier having the opposite polarity from those in the other. Means are also provided for supplying a second input such as a signal voltage to the second set of grids with parallel input connections instead of push-pull input connections but with opposite phase relation in the two amplifiers. The amplifiers are connected with parallel push-pull plate loads so that the differential output varies in polarity and magnitude in accordance with the variations in phase relationship between the input voltages.

A better understanding of the invention will be afforded by the following detailed description considered in connection with the accompanying drawing, and those features of the invention which are believed to be novel and patentable will be pointed out in the claims appended hereto.

In the drawing.

Like reference characters are utilized throughout the drawing to designate like parts.

Figure 1:
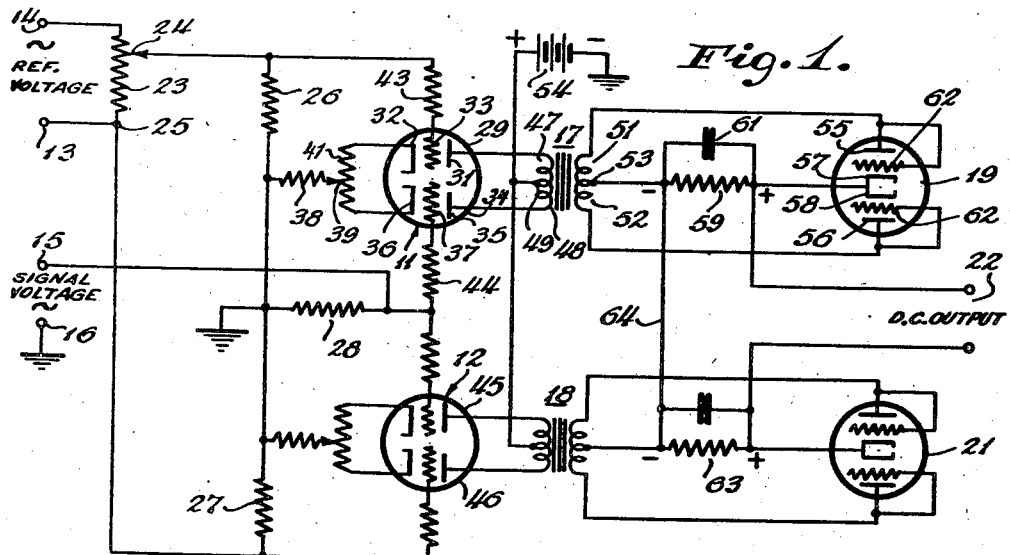
Fig. 1 is a circuit diagram of one embodiment of my invention.

The illustrative arrangement shown in Fig. 1 comprises a pair of current controlling devices such as double-triode vacuum tubes 11 and 12 for combining input voltages from two pairs of input terminals such as reference voltage terminals 13, 14 and signal voltage terminals 15 and 16, the latter of which may be grounded, if desired. Associated with the voltage combining tubes 11 and 12 are combining transformers 17 and 18, respectively, and unilateral conducting elements such as bi-phase connected rectifiers 19 and 21 for rectifying the secondary outputs of the transformers 17 and 18, respectively. The rectifiers 19 and 21 are connected, as will be explained hereinafter, for differentially supplying their outputs to a pair of direct current output terminals 22.

For adjusting the magnitude of the reference voltage between terminals 13, 14 to the most satisfactory value for application to the tubes 11 and 12, a potentiometer 23 may be provided comprising a resistor with a sliding tap 24. The tap 24 serves as one output terminal for the potentiometer 23 and a second output terminal may be provided taking the form of a second sliding tap or a fixed terminal 25, as illustrated. The fixed terminal is satisfactory if the voltage between the terminals 13 and 14 is floating so that no balance with respect to ground is required for the voltage between the terminals 24, 25.

A reference voltage input circuit is completed through input resistors 26 and 27 included in one of the grid circuits of the tubes 11 and 12, respectively. An input resistor 28 is connected across the signal terminals 15 and 16.

The tube 11 comprises a triode unit 29 consisting of an anode 31, a cathode 32, and a control electrode or grid 33; and the second triode unit 34 comprises an anode 35, a cathode 36, and a control electrode or grid 37.

The triode units 29 and 34 have a common cathode resistor 38 connected through a tap 39 to an adjustable point in a potentiometer 41 for balancing the loads of the cathodes 32 and 36. The reference voltage input resistor 26 is included in the grid circuit of the triode unit 29 which may include also a series grid resistor 43. The signal voltage input resistor 28 is included in the grid circuit of the triode unit 34 which may also include a series grid resistor 44.

The signal voltage input resistor 28 is connected in the same relation to a triode unit 45 forming one-half of the tube 12. The reference voltage input resistor 27 is connected in the input circuit of a second triode unit 46 forming the other half of the tube 12, but the connections are such that the reference voltage is supplied with opposite polarities to the triode units 29 and 46. It will be understood, of course, that the signal voltage and the reference voltage may be interchanged so that the reference voltages are applied with like polarities to a pair of triode units and the signal voltages are applied with opposite polarities to a pair of triode units.

The current combining transformer 17 has two primary winding means such as a split primary winding with two parts 47 and 48 having a junction terminal 49; and the transformer 17 also has a split secondary winding with two parts 51 and 52 with a junction terminal 53. For supplying discharge current to the tube 11, a suitable source of current represented by a battery 54 is provided. The positive terminal of the battery 54 is connected to the transformer primary mid-terminal 49, whereby the discharge currents of the triode units 29 and 34 flow separately through the transformer winding parts 47 and 48, respectively. The negative terminal of the battery 54 may be grounded in the grounded system illustrated, in which the cathode returns and the resistor 28 are grounded.

The transformer 18 has windings connected to the tubes 12 and 21, in a manner analogous to the connections of the transformer 17.

Although the bi-phase rectifier 19 may take the form of a pair of separate single phase rectifiers, it is shown as a twin type tube with anodes 55 and 56 connected to the outer ends of the transformer secondary winding parts 51 and 52 respectively and with electrically connected cathodes 57 and 58 or a common cathode connected through a load resistor 59 to the transformer secondary junction or mid-terminal 53. Preferably, a smoothing condenser 61 is connected across the load resistor 59.

The tube 19 may be a twin diode tube or, if desired, a twin triode tube may be utilized by tying the grids 62 to the respective anodes 55 and 56.

The twin rectifier tube 21 is connected to the transformer 18 in a manner similar to the twin rectifier 19 and has an output or load resistor 63 also connected in a similar manner. The load resistors 59 and 63 are connected in series with their ends of like polarity connected together to form a differential or series opposed circuit. For example, the negative ends of the resistors 59 and 63 may be connected by a conductor 64 and the remaining ends of resistors 59 and 63 may be connected to the output terminals 22.

When the input terminals 13, 14 and 15, 16 are energized, the control grids of the tubes 11 and 12 will likewise be energized during the positive half cycles of their respective input voltages. Considering, for example, the tube 11 during the positive half cycles of the reference voltage, the grid 33 will be more strongly positive and relatively greater current will flow through the part 47 of the primary winding of the transformer 17. Likewise during positive half cycles of the signal voltage the grid 37 will be more strongly positive and stronger tube current will flow through the part 48 of the primary winding of transformer 17. The currents in the two parts 47 and 48 will flow in opposite directions so that if the reference voltage and the signal voltage are in phase, the amplified currents in the triode units 29 and 34 act in opposition in the primary winding of the transformer 17 and no current flows in the secondary windings 51 and 52. During negative half-cycles when the reference and signal voltages are in phase there is no tendency for current to flow in either part of the primary winding of the transformer 17. If the reference voltage and the signal voltage are 180° out of phase, however, the opposition effect is reduced to a minimum and relatively greater current flows through the primary winding of the transformer 17 during each half cycle. Such current flows in the winding parts 47 and 48 during alternate half-cycles since the grids 33 and 37 are alternately positive. Accordingly, voltage is induced in the secondary windings 51 and 52 during each half-cycle. Consequently, a rectified output occurs across the load resistor 59 since the center-tap transformer secondary winding and the bi-phase rectifier 19 act in a conventional manner to produce a direct current through the resistor 59 proportional to voltage across the ends of the secondary windings 51, 52.

Since the input to one of the triode units 45 and 46 has been reversed with respect to the polarity of the corresponding input to one of the triode units 29 or 34, the currents in the current-combining tube 12 act in opposition in the transformer 18 when the currents in the tube 11 are aiding and vice versa. Consequently, for varying phase relationships, the relative outputs from the secondary windings of the transformers 17 and 18 vary in magnitude and polarity and likewise the voltages in the resistors 59 and 63 vary with the phase relationship. Thus, for a given phase relationship maximum current flows in the resistor 59 and minimum in resistor 63 and an output of given polarity appears at direct current output terminals 22. With a reverse in phase relationship the polarity reverses. For intermediate phase relationships, the relative durations of time that the grids 33 and 37, e. g., are simultaneously positive are varied and accordingly intermediate values of direct current output are obtained from the output terminals 22. The input voltages are combined vectorially.

Figure 2:
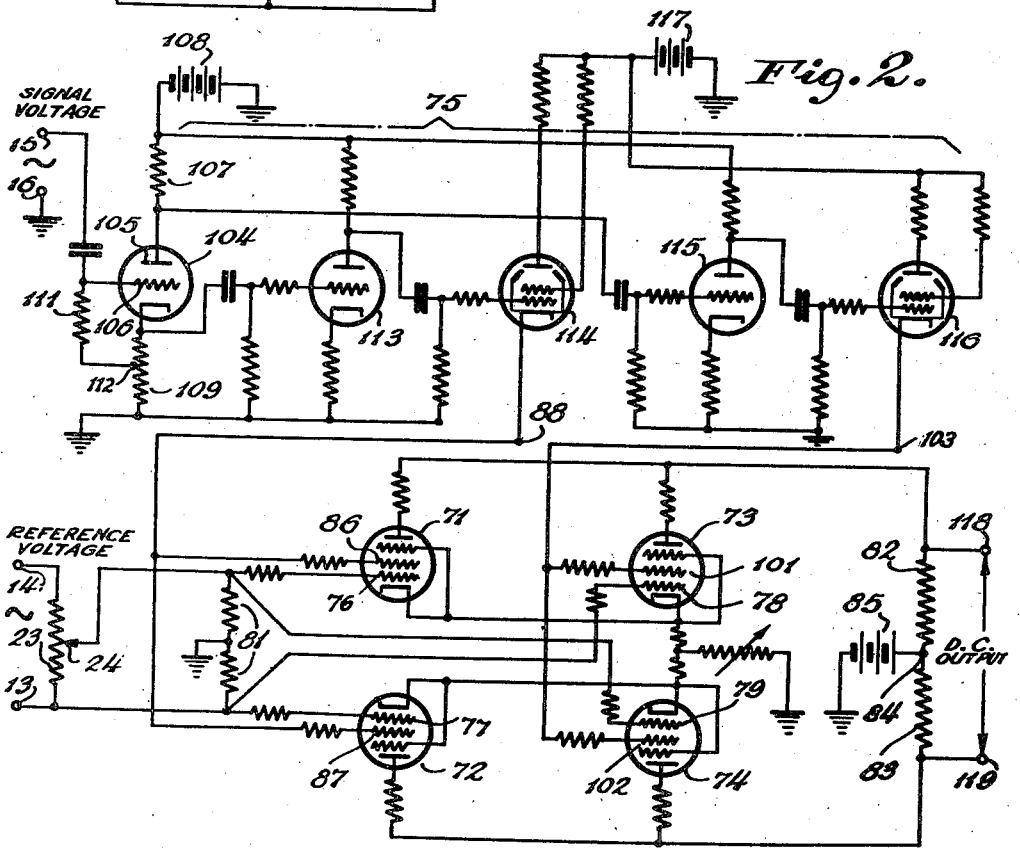
Fig. 2 is a circuit diagram of another embodiment of the invention.

In the arrangement of Fig. 2, there are a pair of push-pull connected current controlling devices 71 and 72 and a corresponding pair of push-pull connected current controlling devices 73 and 74. The tubes 71 to 74 are of the double input type and they may take the form of pentodes, for example. One input may be through a set of Number 1 or control grids and the other input may be through a set of Number 2 or screen grids. The reference voltage input terminals 13 and 14 are coupled to one set of grids and the signal voltage input terminals 15 and 16 are coupled to the other set of grids. An amplifying and phase-splitting inversion circuit 75 is provided for coupling one pair of input terminals to one set of grids supplying input voltages of opposite phase to the two pairs of push-pull connected tubes 71, 72 and 73, 74. In the specific arrangement illustrated, the signal voltage terminals are coupled to the tubes 71—74 through the circuit 75, the reference voltage terminals 13 and 14 are coupled through the potentiometer 23 to the control grids 76, 77, 78 and 79 and these grids are push-pull connected.

The grids 76 and 77 are connected across the center grounded balancing resistor 81, the ends of which are connected to the output of the potentiometer 23, thus supplying potentials of opposite polarity to the control grids 76 and 77. The ends of the resistor 81 are connected also to the grids 78 and 79 of the tubes 73 and 74, but with polarity reversed. The plate circuits of the tubes 71, 72, 73 and 74 are also push-pull connected to a load resistor with two parts 82 and 83 having a junction terminal 84 connected to the positive terminal of a power supply represented by a battery 85. Thus, the pair of tubes 71 and 72 is push-pull connected so that the resistors 82 and 83 form respective anode loads for the tubes 71 and 72. Likewise the pair of tubes 73 and 74 is push-pull connected and is in parallel with the first pair of tubes.

The inversion circuit 75 is connected to the second set of grids of the tubes 71 to 74 in such a manner that the input to the second set of grids is in parallel instead of push-pull. For example, the pair of tubes 71 and 72 has screen grids 86 and 87 both connected to an output terminal 88 of one phase relation in the inversion circuit 75 and the tubes 73 and 74 have screen grids 101 and 102 connected to an output terminal 103 having phase relation opposed to that of the terminal 88 of the inversion circuit 75.

The inversion circuit 75 may comprise an initial splitting inversion stage 104 and amplifying stages.

The stage 104 comprises a current controlling device such as a triode vacuum tube 105 having a control electrode or grid 106 capacitively coupled to the signal voltage terminals 15—16, an anode 105 to which is connected resistor 107 connected in series with the power supply 108, and a grounded cathode resistor 109. The grid circuit of tube 104 may include a grid leak resistor 111 and the portion of the cathode resistor 109 between a tap 112 and the tube 104. For supplying a signal voltage of reversed phase to the inversion terminal 88, an amplifying stage 113 and an electronic control device 114 may be interposed between the cathode resistor 109 and the inversion circuit output terminal 88. Likewise for supplying a signal voltage of the same phase as the terminal 15, an amplifying stage 115 and a control device 116 may be interposed between the anode resistor 107 of the tube 104 and the output terminal 103 of the inversion circuit 75.

The valves or control devices 114 and 116 may take the form of beam-power vacuum-tube amplifiers, if desired, having a common power supply 117. The supply 117 is connected through the tubes 114 and 116 to the inversion circuit output terminals 88 and 103, respectively, for energizing the pair of screen grids 86 and 87 and the pair of screen grids 101 and 102 of the tubes 71 to 74.

Direct current output terminals 118 and 119 may be connected at the ends of the load resistors 82 and 83, respectively.

As a result of the presence of two pairs of push-pull connected tubes, full wave action is provided by the phase responsive circuit. Considering only one pair of tubes, for example, the tubes 71 and 72, it will be observed that the reference voltage and the signal voltage are combined in one relationship in the tube 71 and in the opposite relationship in the tube 72. For example, if the phase relationship is such that the voltages aid in the tube 71, they will act oppositely in the tube 72, and vice versa. Assuming that the input voltages are exactly in phase or exactly in phase opposition, both grids of one of the tubes, such as tube 71, will be energized simultaneously whereas only one of the grids of the other tube 72 is energized. Accordingly, current will flow in the tube 71 but not in the tube 72. With reversal of phase, the current flows in the opposite tube and a reverse of voltage output takes place across resistors 82 and 83.

The second pair of push-pull tubes 73 and 74 provides for flow of current during the half cycles when neither of the tubes 71 and 72 is conductive. If the reference voltage and signal voltage are not exactly in phase or exactly out of phase, the grids of any tube will be simultaneously above cut-off value for only a fraction of a cycle. Accordingly, the relative currents flowing in the tubes 71 and 72 will depend upon the phase relationship between the input voltages. For quadrature relationship, the currents will flow for equal periods of time in both tubes 71 and 72, and similarly in the tubes 73 and 74, resulting in balanced output and zero net output from the output terminals 118 and 119.

In effect, the signal voltage between terminals 15 and 16 is applied with opposite polarities to the screen grids of the pairs of push-pull tubes 71—72 and 73—74. Actually, however, only positive voltages are ever applied to the screen grids, but the voltages are applied at opposite half cycles of the signal voltage. For example, during one half cycle of the signal voltage, the valve 114 conducts and applies a voltage to the terminal 88 and to the screen grids 86 and 87 in parallel, and during the next half cycle the valve 116 applies voltage through the terminal 103 to the screen grids 101 and 102 in parallel. Thus, as far as the screen grids are concerned, the pairs of tubes 71—72 and 73—74 are rendered capable of conducting during opposite half cycles of the signal voltage.

Since the connections of the control grids 78—79 to the reference voltage input resistor 81 are opposite to the connections of the control grids 76 and 77 to the input resistor 81, one or the other of the tubes 71 and 73 has its control grid 76 or 78 rendered positive by the input from the reference voltage. If the reference voltage and signal voltage are in phase, current is supplied during each half cycle through one or the other of the tubes 71 and 73, producing a voltage drop in load resistor 82. However, if the reference voltage and signal voltage are 180° out of phase, currents flow alternately through the tubes 72 and 74 instead, and current flows through the load resistor 83. Thus, the polarity of the output voltage between the direct current output terminals 118 and 119 depends upon the phase relationship between the signal voltage and reference voltage. For intermediate phase angles between zero and 180° current flows through both of the resistors 82 and 83 in relative amounts, depending upon the actual phase angle.

I have herein shown and particularly described certain embodiments of my invention and certain methods of operation embraced therein for the purpose of explaining its principle of operation and showing its application, but it will be obvious to those skilled in the art that many modifications and variations are possible, and I aim, therefore, to cover all such modifications and variations as fall within the scope of my invention which is defined in the appended claims.

What is claimed is:

1. A phase-responsive system comprising, in combination, first and second pairs of input terminals, first and second pairs of current controlling devices, each device having a first and a second control element, the pairs of first elements being connected in push-pull but with opposite input polarities to one of said pairs of input terminals, a phase splitter coupled to the other of said pairs of input terminals, opposite phase output connections from said phase splitter, means for coupling one of said output connections to the second control elements of said first pair of current controlling devices in parallel, and means for coupling the second output connection of said phase-splitting means to the second control elements of said second pair of current controlling devices in parallel, said pairs of current controlling devices having parallel load circuits, whereby the load current varies in magnitude and polarity with variations in phase relationship between voltages applied to the input terminals.

2. A phase-responsive system comprising, in combination, two pairs of current controlling devices, each device having a pair of control elements for a connection to input circuits, means for supplying an input with a push-pull connection to one pair of current controlling devices and for also supplying the same input reversed in polarity with a push-pull connection to the second pair of current controlling devices, and means for supplying a second input in parallel to all four of said current controlling devices, said pairs of current controlling devices having parallel output circuits, whereby the output varies in magnitude and polarity with variations in phase relationship between the two said inputs to the current controlling devices.

3. A phase-responsive system comprising, in combination, first and second pairs of input terminals, first and second pairs of current controlling devices, each device having a first control element and a second control element, the pairs of first elements being connected in push-pull but with opposite input polarities to one of said pairs of input terminals, and a phase splitter coupled between the other of said pairs of input terminals and the pairs of current controlling devices.

4. A phase-responsive system for comparing two inputs comprising, in combination, two pairs of current controlling devices, each device having a pair of control elements for a connection to input circuits, means for supplying one input with a push-pull connection to one pair of current controlling devices and for also supplying the same input reversed in polarity with a push-pull connection to the other pair of current controlling devices, and means for supplying the other input to all of said current controlling devices.

JAMES E. SHEPHERD.

REFERENCES CITED

The following references are of record in the file of this patent:

UNITED STATES PATENTS

| Number | Name | Date |
|---|---|---|
| 1,762,725 | Marrison | June 10, 1930 |
| 2,018,268 | Knowles | Oct. 22, 1935 |
| 2,054,676 | La Pierre | Sept. 15, 1936 |
| 2,183,260 | Hofer | Dec. 12, 1939 |
| 2,217,477 | Gulliksen | Oct. 8, 1940 |
| 2,223,840 | Wolff | Dec. 3, 1940 |
| 2,225,348 | Mikelson | Dec. 17, 1940 |
| 2,287,174 | Heising | June 23, 1942 |
| 2,281,995 | Purington | May 5, 1942 |
| 2,301,635 | Norton | Nov. 10, 1942 |
| 2,085,418 | Crosby | June 29, 1937 |
| 2,349,261 | Ginzton | May 23, 1944 |
| 1,968,068 | Blancard et al. | July 31, 1934 |
| 2,093,512 | Bowen | Sept. 21, 1937 |
| 2,337,328 | Hathaway | Dec. 21, 1943 |
| 1,684,403 | Mason | Sept. 18, 1928 |

FOREIGN PATENTS

| Number | Country | Date |
|---|---|---|
| 400,191 | Great Britain | Oct. 13, 1933 |
| 472,214 | Great Britain | Sept. 20, 1937 |